(12) United States Patent
Ayzenshtat et al.

(10) Patent No.: US 9,075,898 B1
(45) Date of Patent: Jul. 7, 2015

(54) GENERATING AND RANKING INCREMENTAL SEARCH SUGGESTIONS FOR PERSONAL CONTENT

(71) Applicant: Evernote Corporation, Redwood City, CA (US)

(72) Inventors: Mark Ayzenshtat, San Mateo, CA (US); Zeesha Currimbhoy, Mountain View, CA (US)

(73) Assignee: Evernote Corporation, Redwood City, CA (US)

( * ) Notice: Subject to any disclaimer, the term of this patent is extended or adjusted under 35 U.S.C. 154(b) by 180 days.

(21) Appl. No.: 13/924,905

(22) Filed: Jun. 24, 2013

Related U.S. Application Data

(60) Provisional application No. 61/682,089, filed on Aug. 10, 2012.

(51) Int. Cl.
G06F 17/00 (2006.01)
G06F 17/30 (2006.01)

(52) U.S. Cl.
CPC .................................. *G06F 17/3097* (2013.01)

(58) Field of Classification Search
None
See application file for complete search history.

(56) References Cited

U.S. PATENT DOCUMENTS

| | | | |
|---|---|---|---|
| 5,488,725 A * | 1/1996 | Turtle et al. | 1/1 |
| 5,495,600 A * | 2/1996 | Terry et al. | 707/754 |
| 6,505,190 B1 * | 1/2003 | Harel et al. | 707/754 |
| 8,024,335 B2 * | 9/2011 | Anthony et al. | 707/729 |
| 2011/0161311 A1 * | 6/2011 | Mishne et al. | 707/719 |
| 2011/0258212 A1 * | 10/2011 | Lu et al. | 707/760 |
| 2012/0059811 A1 | 3/2012 | Libin et al. | |
| 2013/0311505 A1 * | 11/2013 | McCallum et al. | 707/767 |
| 2013/0318063 A1 | 11/2013 | Ayzenshtat et al. | |

OTHER PUBLICATIONS

Bruza et al, "How nonmonotic is Aboutness?", 1995.*
Naama Kraus, "Context-Aware Query Suggestion", Apr. 2012.*
Sagy et al, "Distributed Threshold Querying of General Functions by a Difference of Monotonic Representation", 2010.*
Manning, Christopher D., et al., "An introduction to information retrieval," Cambridge University Press, Apr. 1, 2009, http://nlp.stanford.edu/R-book/pdf/irbookonlinereading.pdf, Figure 9.2, 4 pp.

* cited by examiner

*Primary Examiner* — Hung Le
(74) *Attorney, Agent, or Firm* — Muirhead and Saturnelli, LLC

(57) ABSTRACT

Providing incremental search suggestions from a content database include accessing the content database to determine possible candidates for the search suggestions, scoring each of the candidates based at least partially on a non-monotonic document frequency function, where candidates that appear a first amount corresponding to a relatively frequent occurrence in the content database and candidates that appear a second amount corresponding to a relatively infrequent occurrence in the content database both score lower than candidates that appear in the content database with a frequency that is between the first amount and the second amount, and ordering the possible candidates based on at least the scoring. Possible candidates may include named entities and n-grams. The n-grams may only be unigrams and bigrams. Stop words may be filtered out of the n-grams. Scoring may include taking into account term frequency.

26 Claims, 6 Drawing Sheets

GENERATING AND RANKING INCREMENTAL SEARCH SUGGESTIONS FOR PERSONAL CONTENT

CROSS-REFERENCE TO RELATED APPLICATIONS

This application claims priority to U.S. Prov. App. No. 61/682,089, filed Aug. 10, 2012, and entitled "METHODS FOR GENERATING AND RANKING INCREMENTAL SEARCH SUGGESTIONS FOR PERSONAL CONTENT DATABASE," which is incorporated herein by reference.

TECHNICAL FIELD

This application relates to the fields of information management, search and presentation of personal and shared information.

BACKGROUND OF THE INVENTION

Incremental search, which is also known as a typeahead search, a find as you type search, word wheeling, autocomplete, etc., has become a feature of search engines and major web browsers, as well as part of mainstream document editing and software development tools, operating systems and many other text aware applications. The incremental search combines two features: generating autocomplete suggestions for a partially typed search term (often referred to as a prefix) and highlighting such prefix within a document or a series of documents. Occurrence statistics may be displayed concurrently with a search session.

The highlighting feature of an incremental search is straightforward and uses fast text indexing and a user-friendly interface, such as multi-color highlighting of several adjacent partially typed terms. For example, when a user types in an incremental search term "hea ins" searching for "health insurance", an incremental search system may apply different highlight colors to every occurrence of the two incomplete terms "hea" and "ins". In contract with the highlighting feature, user satisfaction with the generated incremental search suggestions rests on many factors and uses different techniques that may be sensitive to the type of content, content volume, ownership specifics, privacy considerations and other aspects of search.

Popular applications of incremental search functionality include built-in search features of web browsers (Chrome, Internet Explorer 8, Firefox, etc.), as well as the search fields of search engines (Google, Bing, Yahoo, Ask.com and many other implementations). Incremental search is may also be provided in customized versions of search engines on social networking, professional, e-commerce and other sites, including Facebook, LinkedIn, Amazon.com and Monster.com.

In spite of noticeable differences in functioning, underlying content base and user interface of different implementations, the implementations share similar approaches to building and displaying lists of incremental search suggestions. The suggestions may be derived from a history of public searches in back-end databases of the respective sites or engines, rather than directly from the site content; the popularity (frequency) of previous search of any particular term may play an important role in scoring the term, which ultimately determines inclusion of the term into the suggestion list displayed to a user.

Another significant common feature of existing methods is the treatment of a document frequency (df) parameter; because of very large volumes of content databases used in the above examples, the uniqueness of search terms is highly encouraged and awarded. Many widespread scoring formulas for incremental search suggestions include an "idf" (inverse document frequency) ratio as a multiplier—sometimes, with a logarithmic or other non-linear scaling (consistently with concepts of the information theory). Irrespective of fine details of scaling functions user in those implementations, they share the same reverse monotonic behavior where the suggestion score and the chances of inclusion a term into the suggestion list monotonically decrease when the document frequency value increases.

The common characteristics of many prominent implementations of incremental searching results in success of the incremental searching feature on public websites and search engines. However, the same characteristics may not be immediately applicable to personal content databases, such as user notebooks in the Evernote service and software, designed by the Evernote Corporation of Redwood City, Calif. The amount of content stored in personal content databases may be significantly smaller: for example, the amount of content may be measured in thousands rather than billions of documents. Additionally, a very limited personal search history may be available without any content relevant to billions of public searches in the personal databases. Therefore, the search history and monotonic inverse document frequency approach to generating suggestions for incremental searches may not be relevant to searching personal content databases.

Accordingly, it is desirable to develop adequate systems and methods for generating and ranking of incremental search suggestions that address major differences between public and personal content databases.

SUMMARY OF THE INVENTION

According to the system described herein, providing incremental search suggestions from a content database include accessing the content database to determine possible candidates for the search suggestions, scoring each of the candidates based at least partially on a non-monotonic document frequency function, where candidates that appear a first amount corresponding to a relatively frequent occurrence in the content database and candidates that appear a second amount corresponding to a relatively infrequent occurrence in the content database both score lower than candidates that appear in the content database with a frequency that is between the first amount and the second amount, and ordering the possible candidates based on at least the scoring. Possible candidates may include named entities and n-grams. The n-grams may only be unigrams and bigrams. Stop words may be filtered out of the n-grams. Scoring may include taking into account term frequency. A boost factor may be applied to change scores associated with named entities and/or may be applied to change scores depending upon which of a number of possible parts of a document contains a corresponding candidate. The parts of a document may include a heading, a tag, a body, a footnote, an endnote, a comment, and an attachment. The content database may be a private or semi-private corporate or personal content database, such as provided by either the Evernote content management software and service or the OneNote® note-taking software product. The incremental search suggestions may include partially typed search terms. The partially typed search terms may be prefixes and/or arbitrary contiguous fragments that correspond to possible candidates. The incremental search suggestions may be expanded to include alternative terms driven by various types of semantic relevance.

According further to the system described herein, computer software in a non-transitory computer-readable medium provides incremental search suggestions from a content database. The software includes executable code that accesses the content database to determine possible candidates for the search suggestions, executable code that scores each of the candidates based at least partially on a non-monotonic document frequency function, where candidates that appear a first amount corresponding to a relatively frequent occurrence in the content database and candidates that appear a second amount corresponding to a relatively infrequent occurrence in the content database both score lower than candidates that appear in the content database with a frequency that is between the first amount and the second amount, and executable code that orders the possible candidates based on at least the scoring. Possible candidates may include named entities and n-grams. The n-grams may only be unigrams and bigrams. Stop words may be filtered out of the n-grams. Scoring may include taking into account term frequency. A boost factor may be applied to change scores associated with named entities and/or may be applied to change scores depending upon which of a number of possible parts of a document contains a corresponding candidate. The parts of a document may include a heading, a tag, a body, a footnote, an endnote, a comment, and an attachment. The content database may be a private or semi-private corporate or personal content database, such as provided by either the Evernote content management software and service or the OneNote® note-taking software product. The incremental search suggestions may include partially typed search terms. The partially typed search terms may be prefixes and/or arbitrary contiguous fragments that correspond to possible candidates. The incremental search suggestions may be expanded to include alternative terms driven by various types of semantic relevance.

According further to the system described herein, incremental search suggestion candidates may be extracted directly from personal content collections using several source streams, as explained elsewhere herein. A customized golden mean approach may be used for scoring initial candidates; additional boost factors may be applied to basic scores for certain categories of candidates, as explained elsewhere herein.

Incremental search suggestions may all be chosen to include partially typed search terms, which serve as prefixes or arbitrary contiguous fragments of such suggestions. In other embodiments, a list of suggestions may be expanded to include alternative terms driven by various types of semantic relevance (for example, a list of search suggestions driven by the partial term "bus" may include both the "business" and the "commerce" as alternative search terms, provided both terms are found in the content collection).

Incremental search suggestions may be extracted from personal content or from collectively accessible content, such as a combination of personal Evernote notebooks with shared notebooks within a corporation; a scoring mechanism can be modified to account for a combination of shared content with individual search.

At a time when an incremental search session is performed, a user may have defined a search scope—a combination of content collections used during that session. The search scope may be defined both by user interests and by available and accessible content collections for that particular user. In some embodiments, a user may be able to customize the search scope during the session which may change the suggestion list.

Prior to offering users the incremental search feature, the system may build a suggestion index from all available content collections. The system may process two types of content:

(1) Recognized named entities, including personal and geographic names, addresses, company names, etc.

(2) Unigrams (single words) and bigrams (couples of adjacent words) in the document text. In some embodiments, more extensive sets of n-grams, such as trigrams, may be used.

When processing unigrams and bigrams, the system may filter out stop words, such as common terms (for example, in the text fragment "they received mark of excellence", every pair of adjacent words forms a bigram, except for the two combinations "mark of" and "of excellence"). The system may also retain meaningful text fragments based on detected unigrams and bigrams. After the body of an index has been built, the system may link each term with all notes that contain corresponding fragments to optimize future search performance.

At the search phase, the system may process user input in a search field, which may also be implemented as a regular text field in a form, a dialog box or other user interface element. The system may then look for matching incremental search suggestions in the index and may sort out the terms that do not fall within the user search scope. The system may also build a list of all notes that fall within the search scope and include matching terms.

As explained elsewhere herein, in some embodiments, only terms (named entities and n-grams) that contain incremental user-entered searches are included in the preliminary list of suggestion candidates. Such candidates may be prefix-based, so that only terms starting with the user-entered text are included on the candidate list. Alternatively, the candidates may include the user-entered searches anywhere in a term. In other embodiments, semantically relevant terms, such as generalizations, synonyms or terms having similar adjacent words and present in the content collections may also be added to the suggestion list, in order to compensate for the unknown search terms.

According to the proposed technique, several factors may be taken into account when calculating candidate scores.

1. Term frequency (tf) is the number of occurrences of a term in the corpus of text, which is approximately equivalent to the sum of all notes or documents. In some embodiments, the system may take into account and assign different priorities or weights for the subsequent scoring to different parts of documents. Thus, a particular term found in a document or note heading or in a tag assigned to a note may take the priority over the same term found in a regular text of the body of the document, which, in its turn, may have a higher weight than that an occurrence of the term in footnotes, endnotes, comments, attachments, etc. With such multi-tier approach, different layers of content may be accounted for in scoring by, for example, individual multipliers for each term. Empirical evidence shows that for some types of content collections, each occurrence of a body term may have a standard score of 1, while the same term in the note or document heading may have a score of 1.5, and when the same term is found in a footnote, endnote or in an attachment, the term may have a score of 0.7. Additionally, when a user conducts search in a mix of personal and shared databases, different weights may be assigned to content of the user vs. content added by others.

There may be a positive correlation between a tf value and the candidate score. In order to account for lengthy documents where a term may potentially be present multiple times but the importance of such presence is not proportional to an absolute frequency of the term, a logarithmic or other similar non-linear scale may be applied to tf before including the tf into the score of the candidate.

2. Document frequency (df) is the number of different documents containing a term. The role of document frequency in scoring incremental search candidates in personal and shared content collection may be substantially different from the traditional tf*idf approach used in search engines and other applications to assess term relevance in large public databases. Traditionally, small document frequency values indicate unique or rare terms, so that lower df values (and, respectively, high idf values for inverse document frequency) are highly encouraged and increase document relevance. This reasoning is not necessarily true for personal and shared content collections, especially for collections that include materials clipped from other sources, such as the Internet. Taking into account relatively small data volumes in personal collections (e.g., thousands of notes or documents, as opposed to billions of items in public content databases), low document frequency values may not necessarily be evidence of unique or rare candidates that are relevant to a user search. In some cases, such low df values may also reveal exotic terms that have been occasionally captured in user notes and may not be of much interest to the user. Therefore, for ranking candidates for incremental search suggestions derived from the content of personal and shared content collections, a golden mean approach may be used where both very low and very high values of document frequency are discouraged and moderate values indicate relevance, may be more appropriate.

According to the golden mean approach, the df component of scoring is represented by a df weighting function applied to the ratio df/D, i.e. the relative document frequency, where D is the total number of documents, so that the ratio belongs to the unit interval[0, 1]. The df weighting function reaches a maximum at a point of an optimal document frequency (which is calculated experimentally and may depend on an overall size of the user content) and gradually decreases toward both ends of the unit interval.

3. In many cases, named entities obtained via NER (Named Entity Recognition) technologies, may be longer and significantly less frequent compared with other terms. In order to make named entities a competitive content category compared to n-grams, the system may apply an additional boost to scores of such entities.

4. Additional boost factors may be based on distribution statistics of a candidate between different content collections, the active content collection at the search time, search context (content category), etc.

5. The final score of a candidate may be calculated by multiplying the scaled and normalized tf score by the df-weight calculated as explained above using the tf weighting function; if necessary, the score may also be multiplied by boost factors as explained above.

After all available incremental search candidates have been scored, a list containing several top suggestions may be displayed to a user in an autocomplete format: when the user scrolls through the list, alternative suggestions may appear directly in the search field and provide immediate access to the related subset of documents when chosen. The size of a suggestion list may depend on available display space and other parameters of a user interface. The list of search suggestions may optionally be categorized, supplied by score analysis, including information about content layers that have contributed to the candidate scores (for example, top occurrence of a term in note/document headings may be highlighted). In an embodiment, the list of current incremental search suggestions may be augmented by a list of previous searches.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building and displaying adequate incremental search suggestions based on personal and shared data collections in response to a user typing an incomplete search term in a dedicated field or in other search related user interface element(s). In contrast with traditional approach adopted by search engines and other large data collections where the history of previous searches and their popularity controls the process, the present system builds search candidates directly from limited user content collections and uses a new approach to calculating candidate scores which directs candidate selection for the suggestion list.

The system described herein may be implemented using a personal computer (desktop, laptop, or other), a tablet, a cell phone (including a smart phone) and/or any other computing device capable of providing the functionality described herein. In an embodiment, the system described herein is implemented in connection with the Evernote service and software, provided by the Evernote Corporation of Redwood City, Calif. Note, however, that the system may also be implemented with any personal or corporate private or semi-private content database system, such as the OneNote® note-taking software provided by the Microsoft Corporation of Redmond, Wash. The personal database system may or may not be cloud-based.

Figure 1:
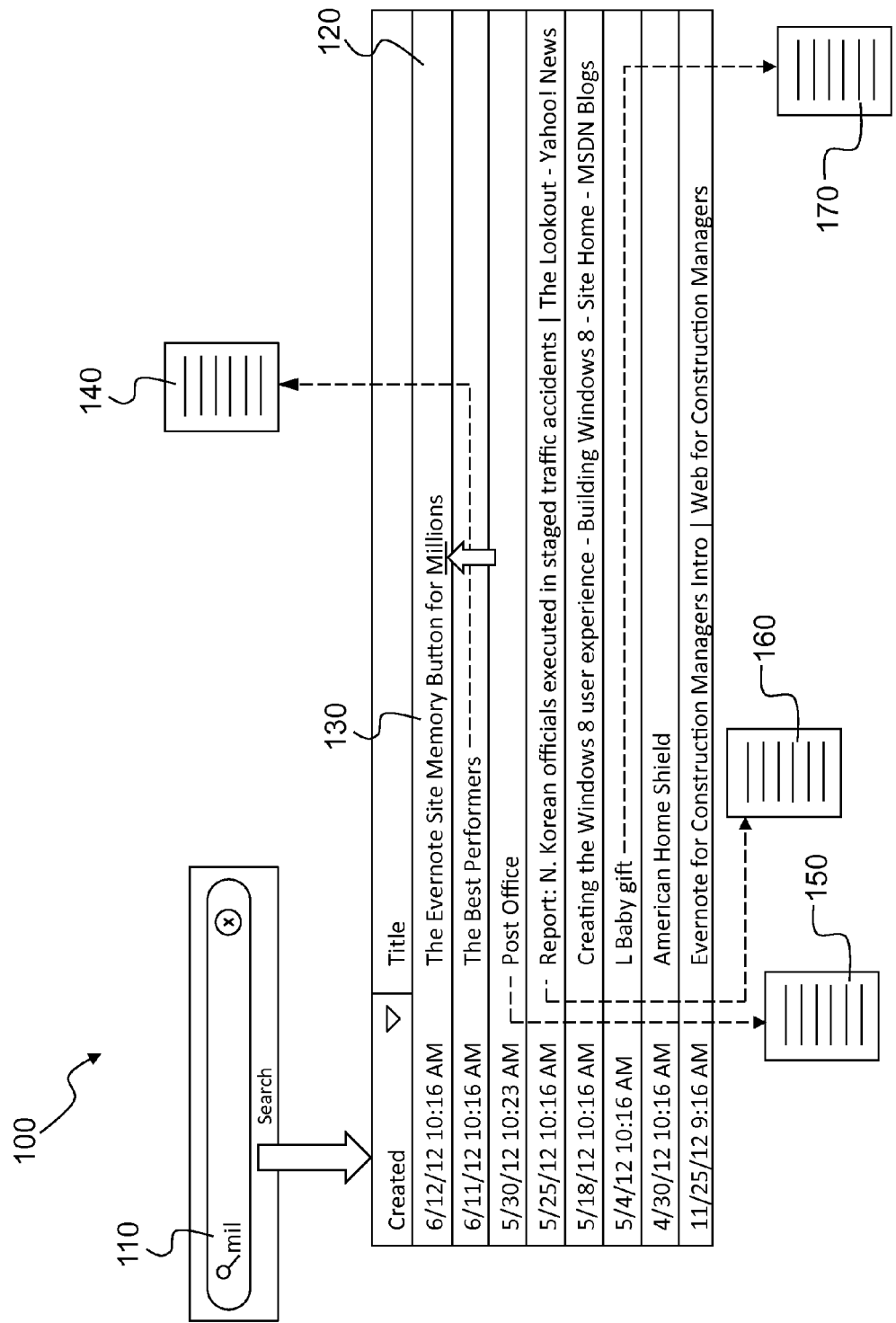
FIG. 1 is a schematic illustration of selection of suggestion candidates from a content collection, according to an embodiment of the system described herein.

FIG. 1 is a schematic illustration of selection of suggestion candidates from a content collection, according to an embodiment of the system described herein. FIG. 1 shows an incremental (incomplete) search term "mil" typed by a user into a search field 110 of a content management application. The system builds search candidate sources, such as named entities and n-grams, containing the incremental search term, and pulls together a subset 120 of all notes or documents that include the incremental term, as shown on FIG. 1; some of the entries are further explained on FIG. 2. Thus, a first note 130 in a subset 120 includes the incremental search term as part of the work "millions" in a title of the note, "The Evernote Site Memory Button for Millions", as shown by a block arrow on FIG. 1. Therefore, the word "millions" is included in a preliminary list of candidates and may appear on a suggestion list depending on a score of the term "millions". It should be noted that, since the search candidate appears in a document header, a regular term frequency score of the candidate may be heightened through multiplying it by a header factor, for example, by a weight 1.5, as explained elsewhere herein. A plurality of other notes 140, 150, 160, 170, obtained by the system, do not include the incomplete search term in headings of the notes 140, 150, 160, 170, the inclusion of which is explained in more detail elsewhere herein.

Figure 2A:
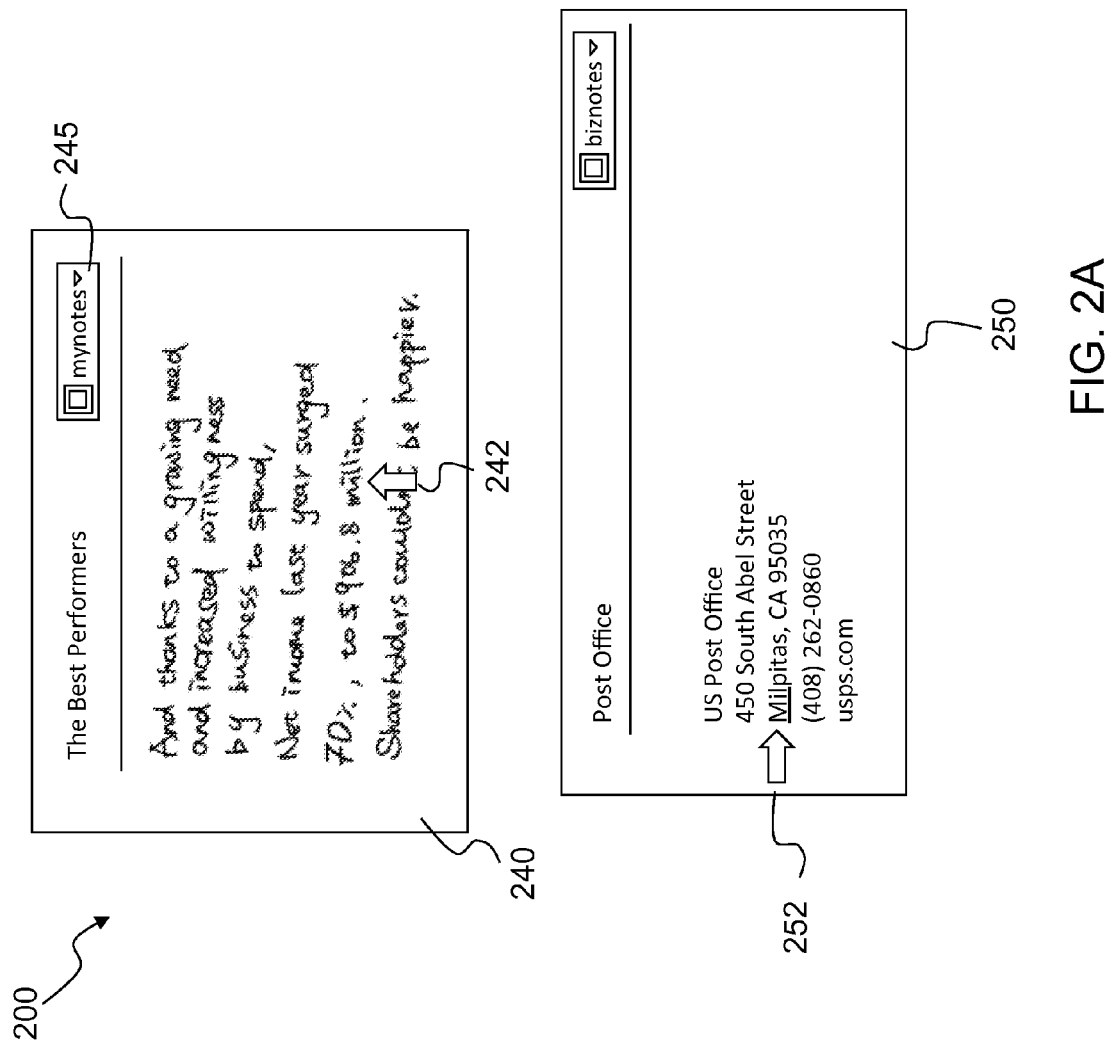
FIGS. 2A-2B are schematic illustrations of suggestion candidates obtained from different types of notes and sources of candidates, according to an embodiment of the system described herein.

FIG. 2A is a schematic illustration 200 of two suggestion candidates extracted from two notes 240, 250, corresponding to the notes 140, 150 previously shown in FIG. 1 without content details. The note 240 is handwritten and is obtained from a content collection 245 (for example, an Evernote notebook "mynotes"). A search candidate is a word "million" (pointed to by an arrow 242) obtained through the unigram source. The unigram source may have been augmented by results of handwriting recognition applied to the note 240. The note 250, obtained from a different content collection titled "biznotes", shows a post office address recognized via a named entity recognition (NER) technique, which includes a preliminary search candidate "Milpitas", a California city name (annotated by an arrow 252). The two candidate notes 240, 250 may follow different calculation paths of the scoring algorithm, since the word "Milpitas" may get an additional boost as a relatively rare named entity, as explained elsewhere herein.

Figure 2B:
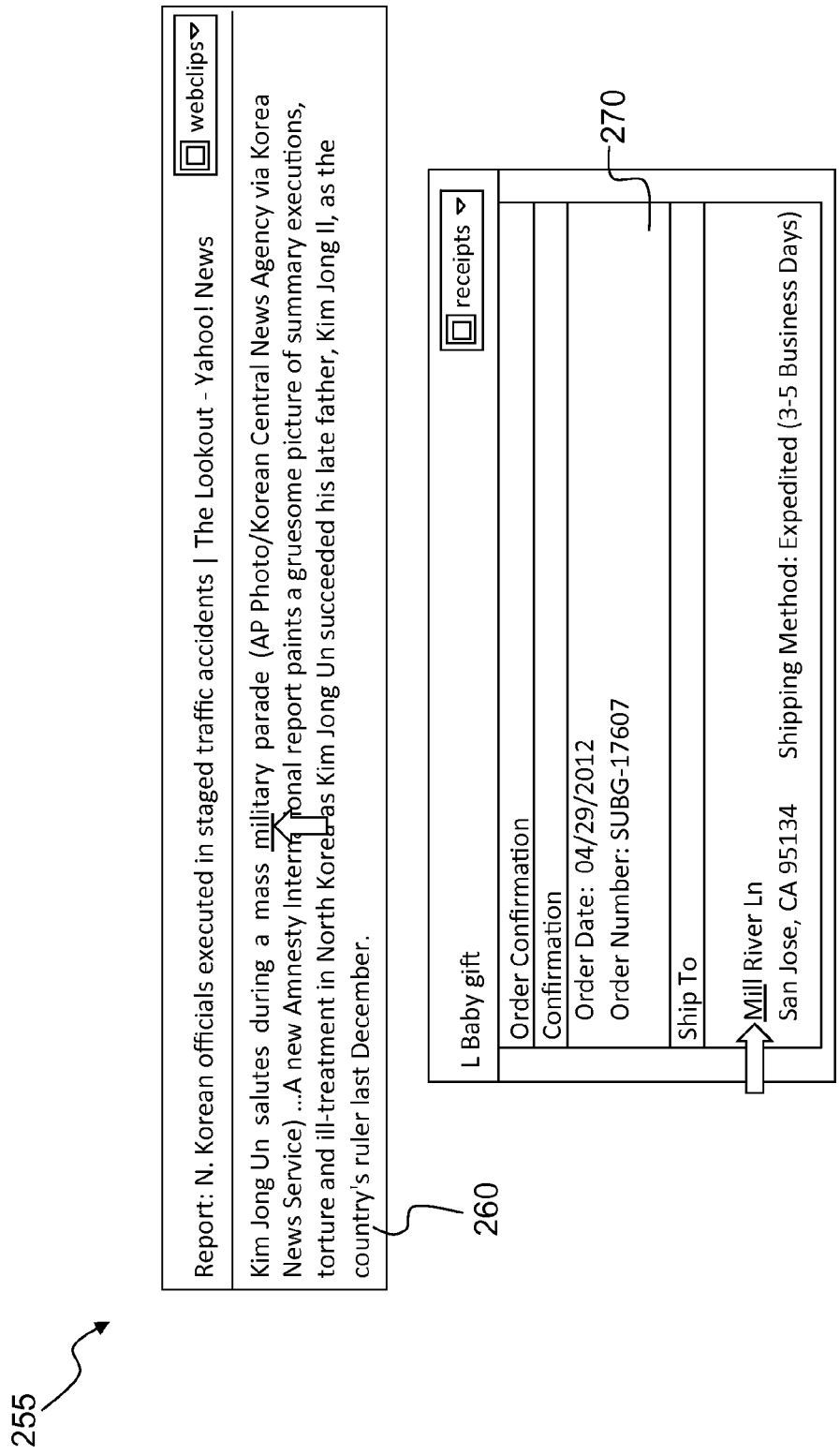

FIG. 2B is a schematic illustration 255 of two more preliminary search candidates extracted from two notes 260, 270, corresponding to the notes 160, 170, which are briefly illustrated on FIG. 1. Similarly to FIG. 2A, the first note 260, a fragment of an article clipped into a content collection "webclips", contains a search candidate "military" extracted from the unigram source, while the note 270, a purchase receipt from a content collection "receipts", shows a portion of home address extracted via NER that includes a search candidate "Mill" as part of a street name "Mill River Ln" in San Jose, Calif.

Figure 3:
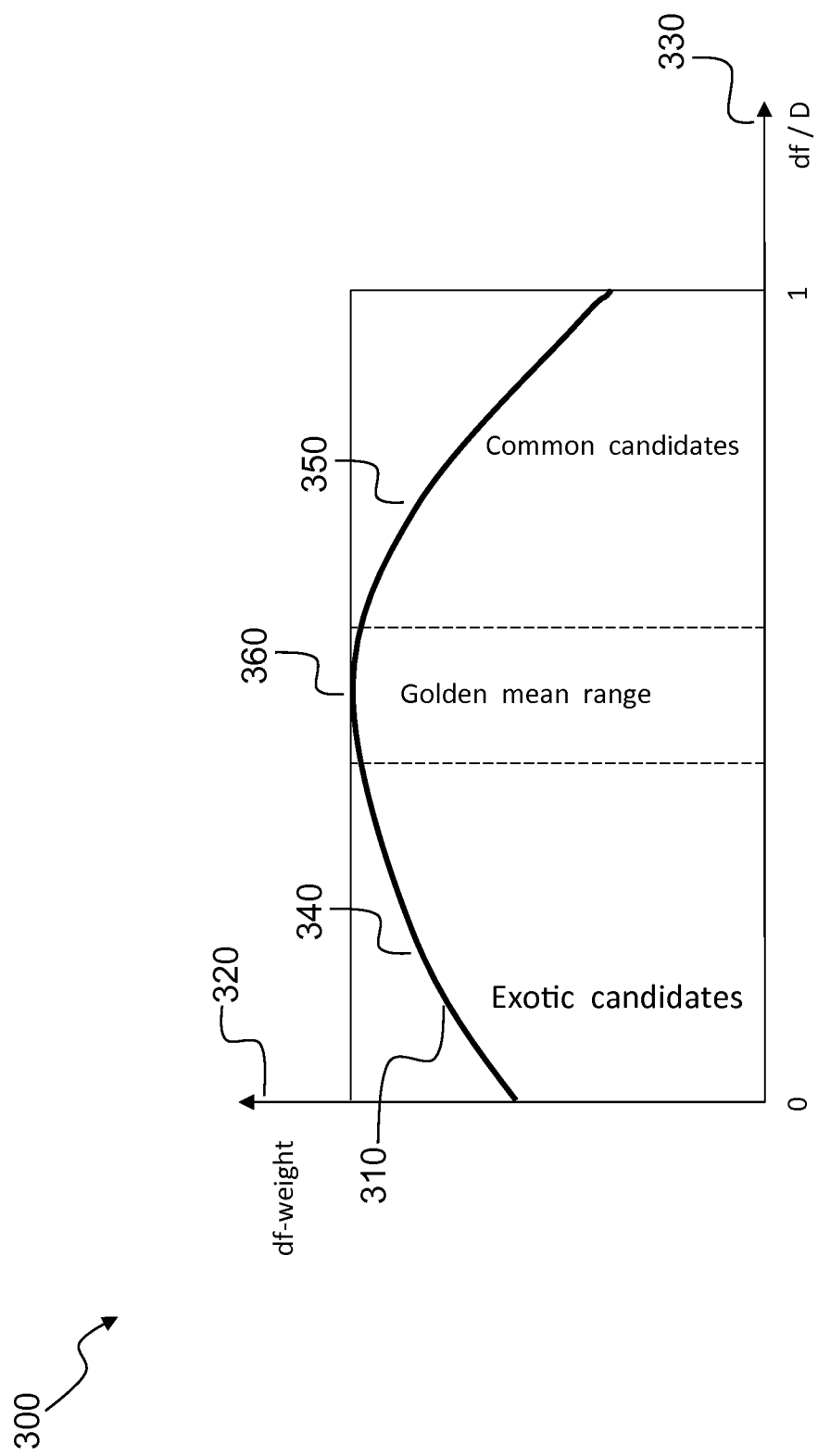
FIG. 3 is a schematic illustration of a df weighting function, according to an embodiment of the system described herein.

FIG. 3 is a schematic illustration 300 of a document frequency weighting function used by the system instead of traditional monotonic df (or idf) multipliers utilized by traditional incremental search algorithms. A function 310 defines a df-weight 320 on a vertical axis for each normalized df/D value 330 on the unit interval[0; 1]. In contrast with a traditional approach, the function 310 is non-monotonic: low argument values in a range 340 correspond to exotic candidates. The df-weights for exotic candidates are suppressed. Similarly. df-weights for common candidates in a higher range 350 are also suppressed. Optimal (maximum) values of the df-weight are reached in a golden mean range 360. The df weighting function may be applied to each search candidate at a scoring phase, as explained elsewhere herein.

Figure 4:
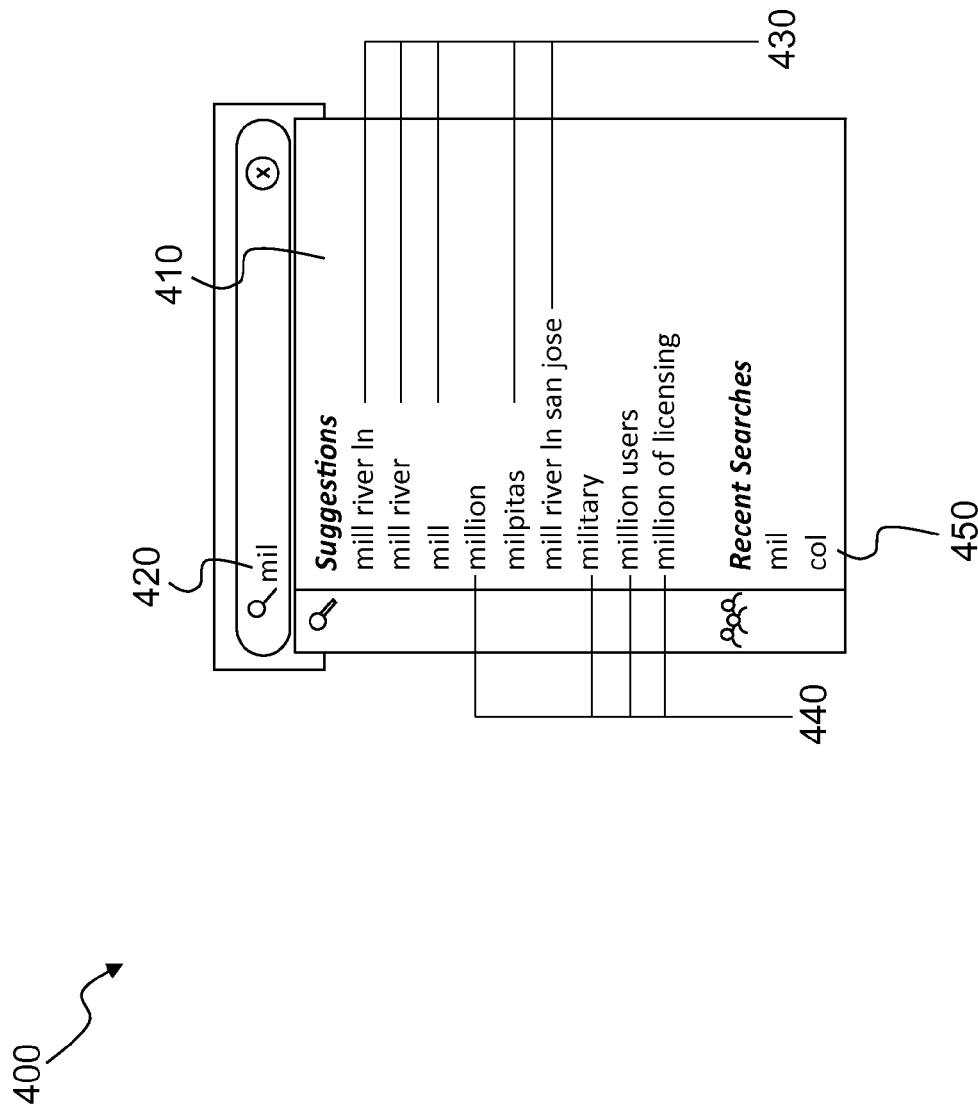
FIG. 4 is a schematic illustration 400 of a search suggestion list generated from named entities and n-grams, according to an embodiment of the system described herein.

FIG. 4 is a schematic illustration 400 of a search suggestion list 410 generated from named entities and n-grams in response to user typing of an incremental search term 420. The list is displayed on a screen of a user device in an order of final candidate scores and may include original terms found in notes and in an expansion of text near a corresponding candidate in the notes. For example, a nest 430 of search suggestions generated from named entities may include portions of a street address "mill river ln", "mill river", and "mill", while a nest of search candidates 440 extracted from n-grams and related to a word "million" may also include fragments of note text from different notes, such as "million users" and "millions of licensing". A history of searches 450 may also be displayed with the search suggestion list. When a search suggestion is chosen from the list by a user, the search suggestion may immediately replace an incremental, incomplete search term and additional search options may be displayed near the search field; for example, a user may choose between searching in a full set of personal and shared content collections available to the user, searching only in personal data of the user or searching within a current data collection that was opened when the user had entered the incremental search term.

Figure 5:
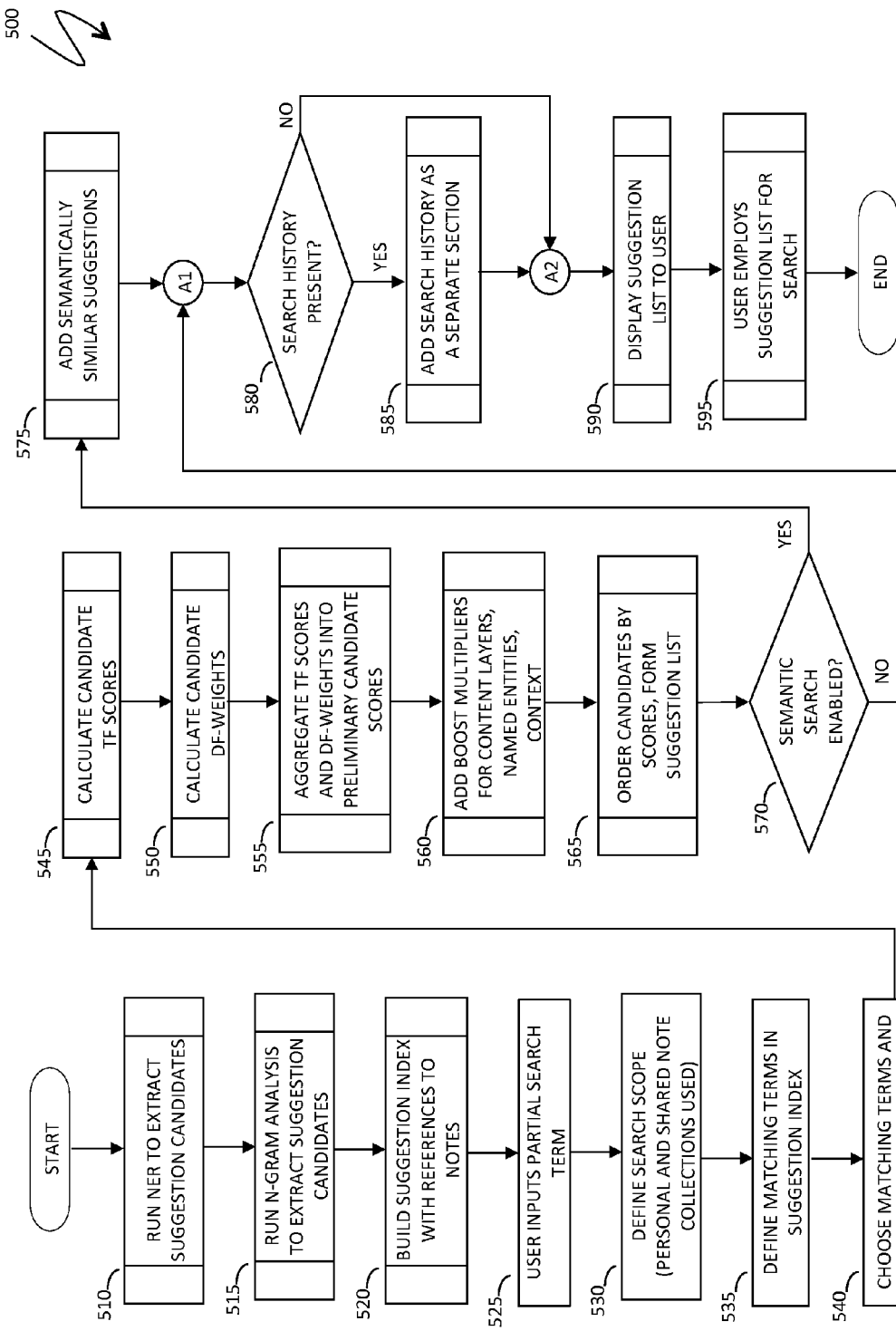
FIG. 5 is a system flow diagram illustrating building, displaying, and using a list of incremental search suggestions according to an embodiment of the system described herein.

Referring to FIG. 5, a flow diagram 500 illustrates processing performed in connection with building, displaying and using a list of incremental search suggestions. Processing starts at a step 510 where the system runs named entity recognition for a whole set of content collections and extracts NER based suggestion candidates. After the step 510, processing proceeds to a step 515, where the system runs n-gram analysis to identify n-gram based suggestion candidates. (Examples of suggestion candidates are presented on FIGS. 1, 2A, 2B). At the steps 510, 515, the system filters out stop words and includes as suggestions certain larger text fragments. After the step 515, processing proceeds to a step 520 where the system builds a suggestion index by linking suggestions associated with each term with all notes in all content collections that include the term.

After the step 520, processing proceeds to a step 525, where the user enters an incremental search term. After the step 525, processing proceeds to a step 530, where the search scope is determined based on active content collection at the time of user search and other personal and shared content collection to which the user has access at the search time. After the step 530, processing proceeds to a step 535, where the system identifies a preliminary list of search candidates by looking up matching terms in the suggestion index. After the step 535, processing proceeds to a step 540, where a preliminary list of search candidates is adjusted based on a search scope by filtering out extraneous matching terms that do not fall within the search scope; at the same step, the list of all notes within the search scope, containing search candidates from the adjusted list is built.

After the step 540, processing proceeds to a step 545, where term frequency (tf) scores of the preliminary search candidates from the adjusted list are calculated. After the step 545, processing proceeds to a step 550, where document frequency weights (df-weights) of candidates are calculated using a df weighting function, explained in more details in conjunction with FIG. 3 and elsewhere herein. After the step 550, processing proceeds to a step 555, where a tf score and df-weight are aggregated into a preliminary candidate score of each candidate either by multiplying values of the weights or by employing a more complex aggregated function. After the step 555, processing proceeds to a step 560, where the system modifies candidate scores and calculates final scores by applying boost multipliers related to content layers, named entities, search scope and context, etc. After the step 560, processing proceeds to a step 565, where an adjusted list of preliminary search candidates is ordered by final scores; the top candidates form the search suggestion list to be displayed to the user. The length of the list may depend on several factors, such as the distribution of scores, display size limitations, nesting factor where not only raw candidates but also contextual fragments of content are included on the suggestion list, the presence of absence of semantically similar search terms, etc.

After the step 565, processing proceeds to a test step 570, where it is determined whether semantic search is enabled. If so, processing proceeds to a step 575; otherwise, processing proceeds to a test step 580. At the step 575, alternative terms that are semantically similar to search suggestions and present within the search scope are added to the search suggestion list. Processing at the step 575 may include additional scoring and may be implemented via different user interface designs, such as, for example, direct addition of similar terms to the suggestions list or adding links to "similar items" with some or all of the original search candidates. After the step 575, processing proceeds to a test step 580, which may be independently reached from the test step 570. At the test step 580, it is determined whether the search history is present (and enabled). If so, then processing proceeds to a step 585; otherwise, processing proceeds to a step 590. At the step 585, search history is added as a separate section to the suggestion list as illustrated in conjunction with FIG. 4. After the step 585, processing proceeds to the step 590, which may be independently reached from the test step 580. At the step 590, the suggestion list is displayed to a user (see FIG. 4). After the step 590, processing proceeds to a step 595, where the user employs search suggestion list for search by selecting an item from the list and accessing the related content. After the step 595, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing incremental search suggestions from a content database, comprising:
   accessing the content database to determine possible candidates for the search suggestions;
   scoring each of the candidates based at least partially on a non-monotonic document frequency function, wherein candidates that appear a first amount corresponding to a relatively frequent occurrence in the content database and candidates that appear a second amount corresponding to a relatively infrequent occurrence in the content database both score lower than candidates that appear in the content database with a frequency that is between the first amount and the second amount; and
   ordering the possible candidates based on at least the scoring.

2. A method, according to claim 1, wherein possible candidates include named entities and n-grams.

3. A method, according to claim 2, wherein the n-grams are only unigrams and bigrams.

4. A method, according to claim 2, wherein stop words are filtered out of the n-grams.

5. A method, according to claim 1, wherein scoring includes taking into account term frequency.

6. A method, according to claim 5, wherein a boost factor is applied to change scores associated with named entities.

7. A method, according to claim 5, wherein a boost factor is applied to change scores depending upon which of a number of possible parts of a document contains a corresponding candidate.

8. A method, according to claim 7, wherein the parts of a document include a heading, a tag, a body, a footnote, an endnote, a comment, and an attachment.

9. A method, according to claim 1, wherein the content database is private or semi-private corporate or personal content database.

10. A method, according to claim 9, wherein the content database is provided by one of: the Evernote content management software and service and the OneNote® note-taking software product.

11. A method, according to claim 1, wherein the incremental search suggestions include partially typed search terms.

12. A method, according to claim 11, wherein the partially typed search terms are at least one of: prefixes and arbitrary contiguous fragments that correspond to possible candidates.

13. A method, according to claim 1, wherein the incremental search suggestions are expanded to include alternative terms driven by various types of semantic relevance.

14. A non-transitory computer-readable medium containing software that provides incremental search suggestions from a content database, the software comprising:
   executable code that accesses the content database to determine possible candidates for the search suggestions;
   executable code that scores each of the candidates based at least partially on a non-monotonic document frequency function, wherein candidates that appear a first amount corresponding to a relatively frequent occurrence in the content database and candidates that appear a second amount corresponding to a relatively infrequent occurrence in the content database both score lower than candidates that appear in the content database with a frequency that is between the first amount and the second amount; and
   executable code that orders the possible candidates based on at least the scoring.

15. A non-transitory computer-readable medium, according to claim 14, wherein possible candidates include named entities and n-grams.

16. A non-transitory computer-readable medium, according to claim 15, wherein the n-grams are only unigrams and bigrams.

17. A non-transitory computer-readable medium, according to claim 15, wherein stop words are filtered out of the n-grams.

18. A non-transitory computer-readable medium, according to claim 14, wherein scoring includes taking into account term frequency.

19. A non-transitory computer-readable medium, according to claim 18, wherein a boost factor is applied to change scores associated with named entities.

20. A non-transitory computer-readable medium, according to claim 18, wherein a boost factor is applied to change scores depending upon which of a number of possible parts of a document contains a corresponding candidate.

21. A non-transitory computer-readable medium, according to claim 20, wherein the parts of a document include a heading, a tag, a body, a footnote, an endnote, a comment, and an attachment.

22. A non-transitory computer-readable medium, according to claim 14, wherein the content database is private or semi-private corporate or personal content database.

23. A non-transitory computer-readable medium, according to claim 22, wherein the content database is provided by one of: the Evernote content management software and service and the OneNote® note-taking software product.

24. A non-transitory computer-readable medium, according to claim 14, wherein the incremental search suggestions include partially typed search terms.

25. A non-transitory computer-readable medium, according to claim 24, wherein the partially typed search terms are at least one of: prefixes and arbitrary contiguous fragments that correspond to possible candidates.

26. A non-transitory computer-readable medium, according to claim 14, wherein the incremental search suggestions are expanded to include alternative terms driven by various types of semantic relevance.

\* \* \* \* \*